(12) United States Patent
Böckle et al.

(10) Patent No.: US 6,826,059 B2
(45) Date of Patent: Nov. 30, 2004

(54) DRIVE FOR LIGHT-EMITTING DIODES

(75) Inventors: Reinhard Böckle, Maeder (AT); Peter Hein, Fraxern (AT)

(73) Assignee: TridonicAtco GmbH & Co. KG, Dornbirn (AT)

( * ) Notice: Subject to any disclaimer, the term of this patent is extended or adjusted under 35 U.S.C. 154(b) by 17 days.

(21) Appl. No.: 10/242,729

(22) Filed: Sep. 13, 2002

(65) Prior Publication Data

US 2003/0043611 A1 Mar. 6, 2003

Related U.S. Application Data

(63) Continuation of application No. PCT/EP01/02640, filed on Mar. 8, 2001.

(30) Foreign Application Priority Data

Mar. 17, 2000 (DE) .......................................... 100 13 207

(51) Int. Cl.[7] ............................................. H02M 3/335
(52) U.S. Cl. ............................... 363/17; 363/16; 363/89
(58) Field of Search ................................. 363/131, 132, 363/127, 95, 97, 16, 17, 89; 315/307, 244, 247, 291

(56) References Cited

U.S. PATENT DOCUMENTS

| 5,287,853 A | * | 2/1994 | Vester et al. ................. 600/323 |
| 5,661,645 A |  | 8/1997 | Hochstein ..................... 363/89 |
| 5,677,602 A | * | 10/1997 | Paul et al. ................... 315/224 |
| 6,016,038 A |  | 1/2000 | Mueller et al. ............. 315/291 |
| 6,091,355 A | * | 7/2000 | Cadotte et al. ............. 342/104 |

FOREIGN PATENT DOCUMENTS

| EP | 0567280 A | 10/1993 |
| EP | 0581206 A2 | 2/1994 |
| JP | 01259754 A | 10/1989 |

* cited by examiner

Primary Examiner—Rajnikant B Patel
(74) Attorney, Agent, or Firm—Fitzpatrick, Cella, Harper & Scinto

(57) ABSTRACT

A circuit and a method for controlling light emitting diodes (D1, D2) for illumination involve an inverter whose output frequency can be varied. The inverter includes two electronic switches (S1, S2) which convert an applied direct current voltage ($U_o$) into an alternating voltage. A load circuit is connected to the output of the inverter and includes a resonance element and at least one light emitting diode (D1, D2) whose brightness is controlled by altering the output frequency of the inverter.

20 Claims, 4 Drawing Sheets

DRIVE FOR LIGHT-EMITTING DIODES

CROSS REFERENCE TO RELATED APPLICATIONS

This is a Continuation of International Application PCT/EP01/02640 filed Mar. 8, 2001 which in turn claims priority of German application DE 100 13 207.3, filed Mar. 17, 2000, the priorities of which are hereby claimed, said International Application having been published in German, but not in English, as WO 01/69978 A1 on Sep. 20, 2001.

BACKGROUND OF THE INVENTION

1. Field of the Invention

The present invention relates to a circuit arrangement for supplying voltage and controlling the operating behavior of light-emitting diodes for illumination purposes and a method therefor.

2. Description of the Related Art

The use of light-emitting diodes in indicating devices has already been known for a long time, but the first light-emitting diodes had only a low light output and their application was therefore limited to this region. It is only recently that light-emitting diodes can be produced that have now adequate luminosity to justify use for illumination purposes. As a rule, a multiplicity of light-emitting diodes are combined in this connection in a matrix arrangement (array) in order to form a radiator, such as, is described, for example, in U.S. Pat. No. 6,016,038.

In that case, the light-emitting diodes are usually driven by a constant-current source in which the current flowing through the diode or diodes is determined and regulated to a specified set point value. Said set point value is preferably chosen in such a way that the light-emitting diodes are operated with as high an efficiency as possible. Such a constant-current source comprises a bipolar transistor whose collector is connected to the light-emitting diodes. The emitter of the transistor is connected to ground by means of an ohmic resistor and the control terminal (base) of the transistor is fed back to regulate the current. The diode current is determined by means of the ohmic resistance and is regulated to the desired value by means of a change in the base voltage of the transistor.

In this connection, there is the option of dimming the light-emitting diode by pulse-width modulation of the signal applied to the base terminal of the transistor. The advantage of this method is that the light-emitting diode is either fully driven or not driven at all, which increases the efficiency of the entire circuit. The frequency of the PWM signal is in this case so high that no flickering can be detected by the human eye.

Since the light-emitting diodes and the associated drive circuits (in particular the constant-current source(s)) have to be very tightly packed for use for illumination purposes in order to achieve an adequate luminosity, there is normally the problem of a very high heat evolution in the case of such arrangements. In particular, the bipolar transistor is exposed to a high thermal loading, which, on the one hand, reduces the efficiency of the entire circuit and, on the other hand, requires certain precautions to be taken in order to avoid a failure of the circuit due to an excessive heat evolution. The measuring shunt used to determine the current flowing through the light-emitting diodes produces, in addition, power loss.

SUMMARY OF THE INVENTION

It is the object of the present invention to provide a circuit arrangement for supplying voltage and for controlling the operating behavior of light-emitting diodes for illumination purposes in which the abovementioned problems are avoided and a brightness control is made possible.

The object is achieved by a circuit arrangement or by a method according to the invention wherein at least one light-emitting diode is disposed within a load circuit that comprises a resonance element and that is connected to the output of an inverter whose output frequency can be varied and that is in turn connected on the input side to a direct-voltage source. At the same time, the inverter has at least two controllable power switches whose switching frequency can be altered to control the brightness of the at least one light-emitting diode.

The altering of said switching frequency has the result that, because of the resonance element disposed in the load circuit, the current flowing through the light-emitting diode and, consequently, the brightness of the diode is altered. This corresponds substantially to the known method of driving and operating gas-discharge lamps by means of electronic ballasts. This immediately yields the option of using the topology of known ballasts, including already known and used illumination systems, to make possible the central control of a multiplicity of distributively disposed illumination means.

A further advantage results from the fact that, with suitable adjustment of the load circuit, the supply direct voltage delivered by the direct-voltage source can be chosen from a wide range. In this connection, all known circuits suitable for this purpose, for example AC/DC converters, DC/DC converters, step-up or step-down converters, are conceivable as direct-voltage source. As a result of the utilization of the resonance of the load circuit, there is furthermore also the option of working with low supply voltages and, nevertheless, operating series connections of a plurality of light-emitting diodes whose total forward voltage is above the supply voltage. With a correspondingly high supply voltage, very many light-emitting diodes can accordingly be connected in series.

A further advantage of the circuit arrangement according to the invention over the constant-current sources used hitherto is that, if suitable power switches are chosen, only very low switching losses and conducting-state power losses occur in the inverter, with the result that higher efficiency is achieved in total. For example, field-effect transistors can be used as power switches, in which case a further advantage emerges that, compared with the bipolar transistor of a constant-current source, only a very low heat evolution is to be feared in the case of the field-effect transistors of the circuit arrangement of the present invention. The power switches of the inverter may, for example, be disposed in the form of a half-bridge circuit or a full-bridge circuit.

More specific aspects of the invention, which relate to developments described and claimed herein. In order, for example, to utilize both half-waves of the alternating voltage generated by the inverter, it is advantageous to connect a plurality of light-emitting diodes or light-emitting diode arrays in anti-parallel in the load circuit so that they are operated in a pulse mode with a maximum of 50% switch-on time in each case. Another option may be to insert a rectifier directly upstream of the light-emitting diodes or the arrays, which results in 100% switch-on time. In this case, the light-emitting diodes are connected in parallel.

A further development of the circuit arrangement according to the invention is that means are provided to determine the current flowing through the light-emitting diode or light-emitting diodes. This results in the option of regulating the switching frequency of the power switches as a function of the current determined and, thereby, to adjust the entire circuit arrangement to a varying number of light-emitting diodes connected in series without increasing the power loss by doing so. Another option is to regulate the supply direct voltage delivered by the direct-voltage source as a function of the current determined. Furthermore, provision can be made to determine the intensity of the light delivered by the light-emitting diodes and thereby adjust the switching frequency of the power switches to a value that corresponds to a desired luminosity of the entire arrangement.

It would furthermore also be conceivable to use light-emitting diodes of various colors in order to establish overall a desired mixed color by a suitable control of the intensity of the various colors. In this case, an inverter is provided for each color of the light-emitting diodes so that the intensity of the various colors can be controlled independently of one another An advantageous development of the invention relates to measures which enable the dimensions of the circuit arrangement to be kept as compact as possible. In order to achieve this, the circuit arrangement comprises, at least partly, a multilayer circuit into which passive components (for example capacitors, inductors and the like) are integrated. This integration is possible, in particular, if the power switches are operated at high frequencies since correspondingly lower capacitance values or inductance values can then be used in the circuit. In the present case, a frequency range of 200 kHz to 1 MHz has proved to be particularly suitable. An increased radiation of electromagnetic high-frequency fields first of all due to the increase in frequency can be avoided by suitable screening measures that can easily be undertaken because of the reduced dimensions of the circuit.

Components may be integrated, for example, by means of multilayer printed-circuit-board technology. Preferably, the multilayer circuit is implemented by an LTCC (low temperature co-fired ceramic) structure that comprises a plurality of low-sintering ceramic layers or sheets that are disposed above one another and between which conductor tracks are situated. Compared with conventional printed-circuit-board technology, said LTCC technology, which has newly been developed in recent years and disclosed, for example, in EP 0 581 206 A2, can achieve yet another miniaturization of the circuit. In this technology, inductances and capacitances, in particular, can be integrated into the multilayer circuit in addition to the conductor tracks. Furthermore, the ceramic material offers the advantage that it conducts heat relatively well, which means that, for the same overall volume, greater powers can be achieved since heat loss is radiated better. Preferably, the heat dissipation is increased yet again by encapsulating the ceramic structure in a metallic housing. An efficient screening of the high-frequency fields radiated by the circuit arrangement into the environment can also be achieved in this way.

At the abovementioned frequencies, many of the components of the circuit arrangement can be integrated into the multilayer circuit. The remaining passive components and also semiconductor chips have, however, still to be mounted on the surface or outside the ceramic structure. In order to achieve as small a space requirement as possible for this purpose also, the semiconductor chips are preferably mounted on the ceramic substrate by means of the known flip-chip (FC) technology. In this connection, a plastic layer that is, on the one hand, electrically conductive perpendicular to the connection level and is insulating in the connection level and that, on the other hand, absorbs stresses occurring in the case of a different thermal expansion of the semiconductor chip and of the ceramic substrate and, consequently, prevents destruction of the semiconductor chip is introduced between the semiconductor mounted without a housing and the contacts on the surface of the carrier substrate.

BRIEF DESCRIPTION OF THE DRAWINGS

The invention is explained in greater detail below by reference to the accompanying drawings in which.

DETAILED DESCRIPTION OF THE PREFERRED EMBODIMENT

Figure 1:
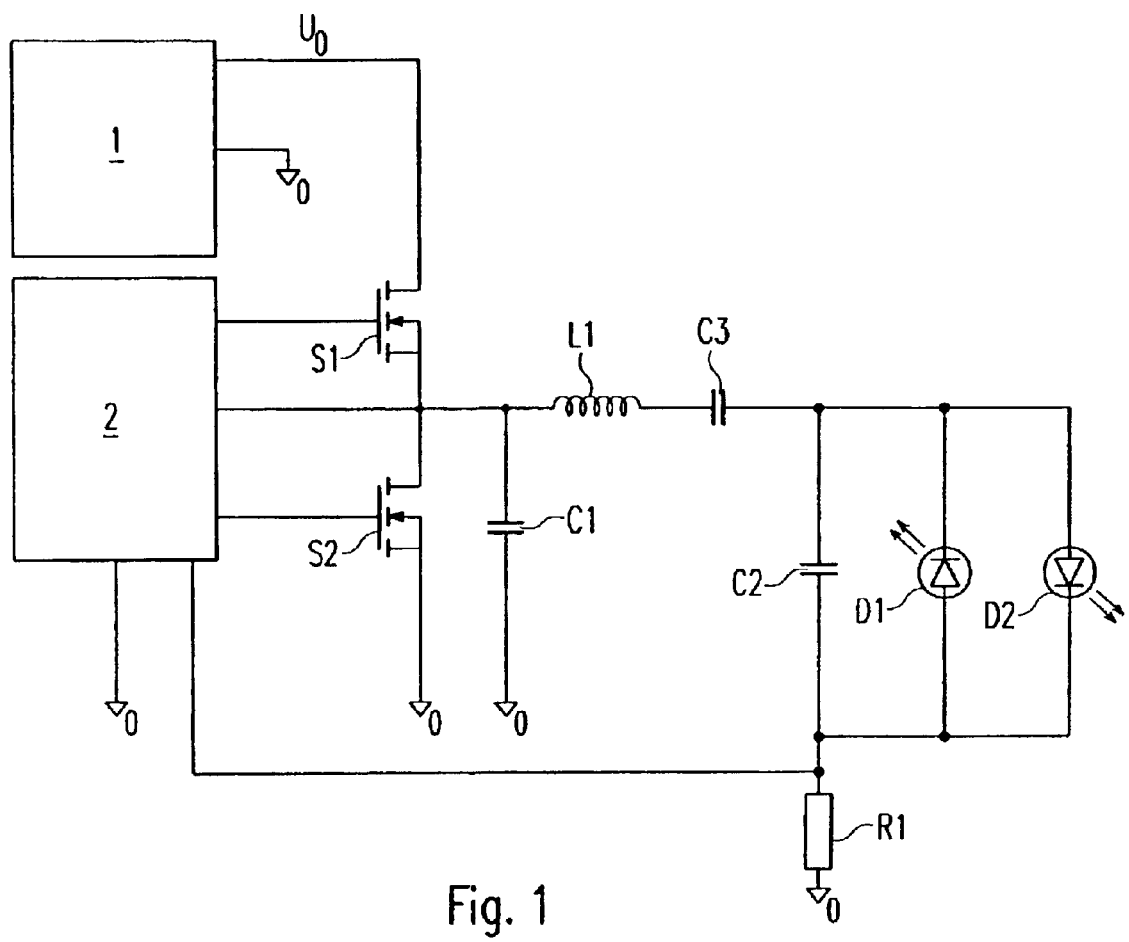
FIG. 1 is a circuit and block diagram showing a first exemplary embodiment of a circuit arrangement of the invention driving two antiparallel-connected light-emitting diode arrays.

Much of the circuit arrangement shown in FIG. 1 is already substantially known through the electronic ballast circuits for operating gas-discharge lamps. At the input of the inverter, which is formed by two field-effect transistors S1 and S2 disposed in a half-bridge circuit, a direct-voltage source 1 is connected that delivers a supply direct voltage $U_0$. The two field-effect transistors S1 and S2 are driven by a control circuit 2. The load circuit, which comprises two antiparallel-connected light-emitting diode (LED) arrays D1 and D2, is connected to the output of the half-bridge.

In the present example, the load circuit is formed by an LC element comprising a choke and a capacitor C3, a capacitor C1 situated in parallel with the second field-effect transistor S2 and a further capacitor C2 situated in parallel with the light-emitting diode arrays. The structure of the load circuit shown in FIG. 1 is, however, only one possible variant. For example, the use of an RLC element, an RL element, an RC element or any other circuit that has suitable resonance behavior is conceivable. Finally, there is also the option of connecting the two diode arrays D1 and D2 directly to the output of the half-bridge, the current through the light-emitting diodes then being controlled by altering the supply direct voltage $U_0$ delivered by the direct-voltage source 1.

The direct-voltage source 1 may be, for example, an AC/DC converter, a DC/DC converter, a step-up converter or step-down converter connected to the mains supply. The supply direct voltage $U_0$ generated by the direct-voltage source 1 may be fixed, but preferably, the direct-voltage source 1 is of regulable design since an alteration in $U_0$ makes possible an adaptation to a variable number of light-emitting diodes.

The brightness of the light-emitting diode arrays D1 and D2, respectively, is controlled by altering the switching frequency of the two field-effect transistors S1 and S2. In order to achieve as high a luminosity as possible, the switching frequency is approximated in this connection to the resonance frequency of the load circuit, while a correspondingly higher or lower frequency is chosen for the dimming. The dimensioning of the parameters of the individual elements of the load circuit is such that the two field-effect transistors S1 and S2 are always switched at such a high frequency that no flickering of the light-emitting diodes D1 and D2, respectively, is detectable for the human eye. If passive components of the circuit are integrated into a multilayer circuit, the field-effect transistors S1 and S2 are preferably switched at a frequency in the range between 200 kHz and 1 MHz.

As is immediately evident on viewing the circuit, the light-emitting diodes of the two arrays D1 and D2 are switched on and switched off in conformity with the half-waves of the alternating voltage generated by the inverter, with the result that a pulsed mode is produced with a 50% switch-on time. In contrast to the known PWM method, however, the brightness is controlled not by altering the ratio of the switch-on and switch-off times, but by controlling the current flowing through the light-emitting diodes.

The internal resistance or the forward resistance of the diodes may alter with time as a result of the unavoidable heat evolution occurring during the operation of the light-emitting diodes. In order to take account of such effects, a measuring shunt R1 is connected in the circuit arrangement shown in FIG. 1 in series with the light-emitting diode arrays D1 and D2, the voltage drop across said resistor RI being determined by the control circuit 2 to assess the current flowing through the arrays D1 and D2. The above-described temperature effects can be compensated for by altering the switching frequency of the two field effect transistors S1 and S2. There is furthermore the option of adapting the entire circuit to a variable number of light-emitting diodes connected in series without increasing the power loss by doing so.

Other means may also be provided instead of the measuring shunt R1 to determine the current flowing through the light-emitting diodes. For example, the current flowing via the half-bridge can be determined by a resistor disposed in the lower branch of the half-bridge. Instead of adapting the appliance to various light-emitting diode numbers by altering the switching frequency, an alteration in the supply direct voltage $U_0$ may also be provided, as mentioned above. As an alternative to the half-bridge arrangement described, the load circuit containing the light-emitting diode arrays D1 and D2 may also be disposed in a full bridge circuit.

Figure 2:
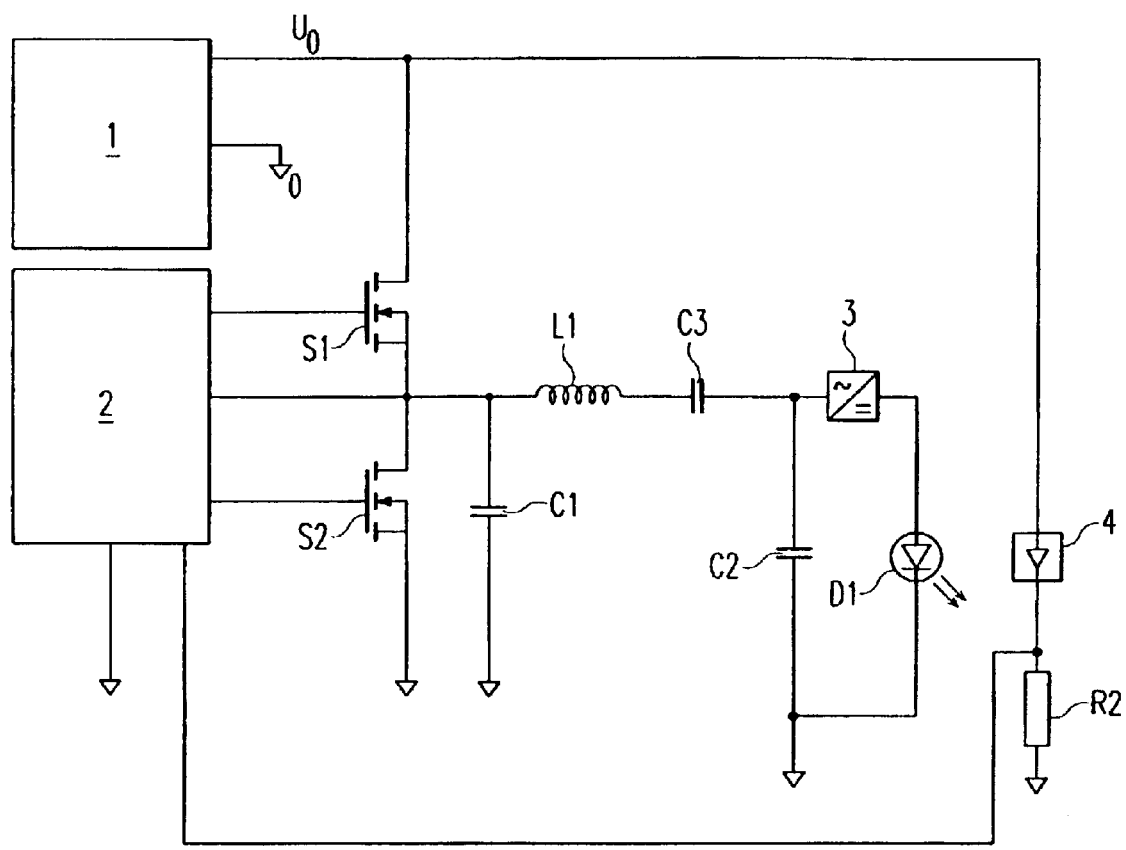
FIG. 2 is a circuit and block diagram showing a second exemplary embodiment of a circuit arrangement of the invention.

FIG. 2 shows a further possible circuit arrangement, but now only one light-emitting diode arrange D1 is provided in the load circuit. In order to achieve the result that the light-emitting diodes are switched on in both half-waves of the alternating voltage generated by the inverter, a rectifier 3 is connected upstream of the array D1. Furthermore, a photosensor 4 is provided with whose aid the luminosity of the light-emitting diodes is determined. This is done as a result of the fact that the input of the photosensor 4 is connected to the direct-voltage source 1 and its output is connected to ground via a measuring shunt R2. The voltage drop across the measuring shunt R2, which is dependent on the luminosity of the light-emitting diodes, is determined by the control circuit 2. This provides the option of compensating for alterations in the performance of the light-emitting diodes occurring during operation and setting a desired brightness value.

In the switching arrangements shown in FIGS. 1 and 2, all the light-emitting diodes are driven jointly so that they all have substantially the same brightness if light-emitting diodes of the same color and same type are involved. There is now the option of using light-emitting diodes of different colors—for example, in the colors red, green and blue—and of generating a desired medium hue (including white light) by suitably controlling the brightness of the different colors. In order, however, to achieve a separate brightness control in each case for the individual colors, one controllable inverter with a load circuit containing the diodes of said color connected thereto is necessary in each case for the light-emitting diodes of each color. The three separate inverters may be connected to a common direct-voltage source or in each case to a separate direct-voltage source. In this case, a central circuit is furthermore provided that coordinates the drive of the different colors by transmitting the necessary brightness values necessary to achieve the desired hue to the individual control circuits for the various colors. The values transmitted by the central control circuit to the individual control circuits are then converted in each case into the desired brightness value.

The structural design of the circuit arrangement according to the invention that is suitable, in particular if switching frequencies in the range from 200 kHz to 1 MHz are used, will now be dealt with below. The LTCC multilayer circuit already mentioned is suitable for the integration of the passive components. The production of such a ceramic multilayer structure will now be explained on the basis of FIGS. 3a–8.

Figure 3A:
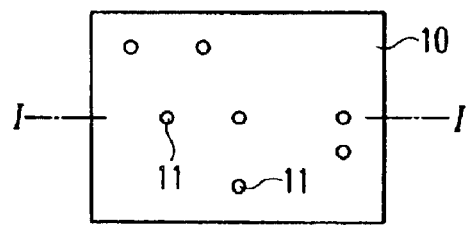
FIGS. 3a, 3b, 4a, 4b, 5, 6, 7 and 8 are plan and cross-sectional views which illustrate successive steps in the manufacture of a multilayer ceramic (LTCC) structure according to the invention.
Figure 3B:
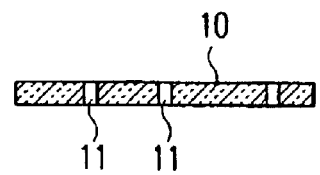
Figure 4A:
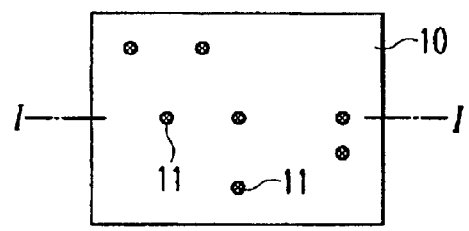
Figure 4B:
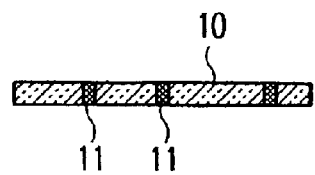

The basic element of an LTCC structure is formed by an approximately 100–130 µm-thick low-sintering ceramic sheet, for example, composed of aluminum oxide that is blended with glass particles and further filler material, as is shown in plan view in FIG. 3a. The first processing step is to punch via holes 11 in the ceramic sheet 10. FIG. 3b shows the appropriate processed ceramic sheet 10 along the section I—I in FIG. 3a. Before the firing process, the diameter of the via holes 11 is about 250 µm. In the next operational step shown in FIGS. 4a and 4b, the via holes 11 are then filled with a conductive material, normally with a conductor paste that has a relatively high solids content.

Figure 5:
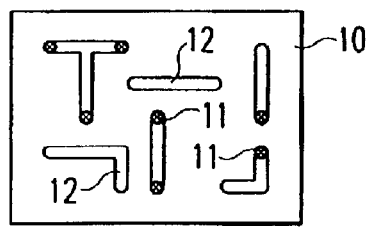

Conductor tracks 12 are then printed on the upper side of the ceramic sheet 10 in accordance with the desired circuit structure (FIG. 5). This is normally done by means of screen printing. In this process, silver pastes, silver/palladium pastes, gold pastes or copper pastes are used for the via holes and for the conductor tracks. In order to avoid bowing, the material composition of the conductor pastes is chosen in such a way that they shrink to the same extent as the ceramic layers 10 themselves in the subsequent sintering.

Figure 6:
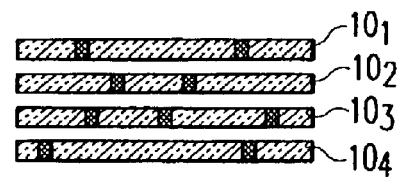
Figure 7:
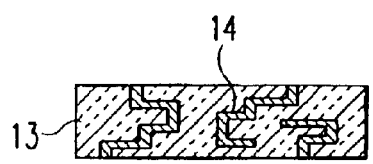
Figure 8:
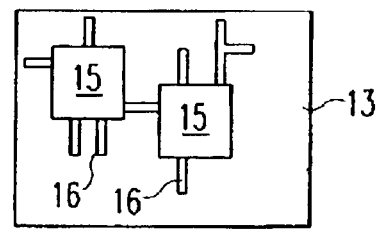

The processing steps just described are first performed separately for each ceramic sheet 10. The individual layers of punched and printed ceramic sheets 10 are then arranged above one another and aligned, as is shown in FIG. 6. They are then stacked in a pressing mold and laminated with heat and pressure being supplied, with the result that a cohesive ceramic structure forms. The latter is finally sintered to form a high-strength ceramic structure, a homogeneous ceramic substrate 13 being formed, as shown in FIG. 7, that has a continuous conductor track network 14 integrated into it.

In the concluding processing step shown in FIG. 10, the components that cannot be integrated into the ceramic circuit, for example diverse semiconductor chips 15, are mounted on the upper side of the ceramic substrate 13 and connected. In this connection, conductor tracks 16 may also be applied retrospectively to the upper side. Finally, the entire complex is provided with connections and surrounded by a metallic housing that increases the heat dissipation on the one hand and screens the high-frequency electromagnetic fields produced during operation on the other.

Figure 9:
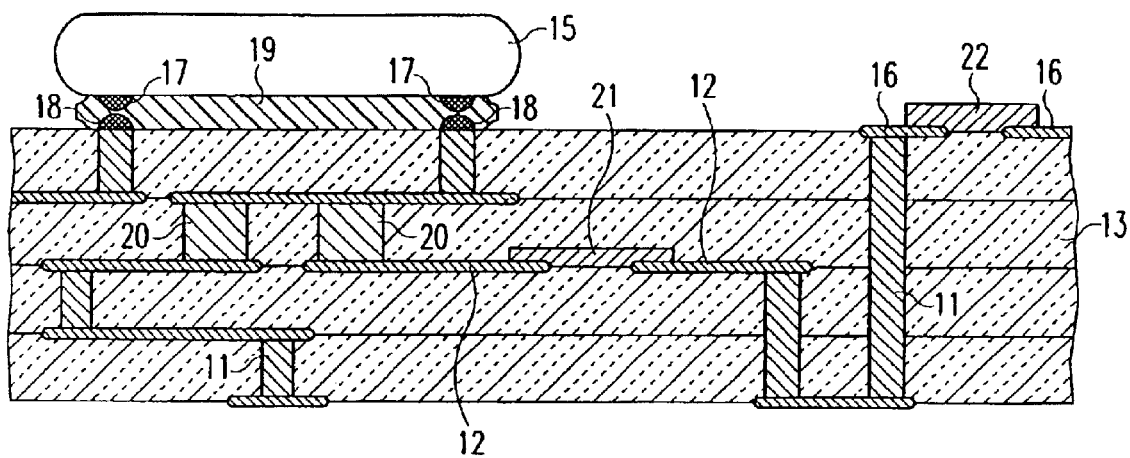
FIG. 9 is an enlarged fragmentary cross-sectional view of an LTCC structure.

FIG. 9 shows yet again a region of the LTCC structure in section in an enlarged view. In this figure, the separating lines between the individual original ceramic layers are still shown, even if, as described above, a homogeneous ceramic structure 13 is formed after the lamination and sintering. As is to be seen on the right-hand side of the diagram, the vertically extending conductor tracks 11, that are formed by the via holes punched out in the first process step, may also extend over several levels in this case. The substantial advantage of the use of an LTCC structure is that not only the conductor tracks 11 and 12, respectively, but also other passive components can be integrated into the multilayer circuit. Within the framework of the processing step shown in FIG. 5, other materials having a certain conductivity may also be applied, for example, to the upper side of an individual ceramic layer 10 in addition to the conductor paste for the general conductor tracks 12, with the result that a resistor 21 can be completely integrated into the ceramic structure 13 in this way. In addition to the usual via holes 11, however, even larger, vertically extending holes, for example, may also be punched in a ceramic layer 10. These can then be filled with a material 20 having a certain permittivity, with the result that integrated capacitances can be implemented in the ceramic substrate 13 by the conductor track/dielectric 20/conductor track layer arrangement shown in FIG. 9.

Furthermore, an inductance can be implemented within the ceramic structure 13 by a spiral conductor track printed on an individual ceramic layer 10. It would also be conceivable, however, to distribute the various windings of the inductance over a plurality of conductor track levels. Such structures are also described as planar inductances. To increase the inductance, an opening or cutout that is filled with a suitable core material, for example ferrite, could furthermore also be provided in the ceramic substrate 13.

Only inductance values and capacitance values up to a certain level can be achieved for the components integrated into the multilayer circuit. Said values are, however, adequate for the correct operation of the circuit arrangement according to the invention at frequencies in the range between 200 kHz and 1 MHz.

However, in the case of LTCC technology, not all the components of the circuit arrangement can be integrated into the multilayer circuit 13. For example, the control circuit is formed by a semiconductor chip 15 that cannot be integrated into the ceramic layer 13. Preferably, contact is then made to such semiconductor chips 15 on the upper side of the multilayer circuit 13 by means of flip-chip technology. In this process, an anisotropic, electrically conducting plastic that is electrically conductive perpendicularly to the flip-chip connection level and is insulating in the connection level is introduced between the upper side of the ceramic substrate 13 and the unencapsulated semiconductor circuit 15. As electrically conducting particles, the plastic contains, for example, irregularly shaped metal pieces or, alternatively, also fairly small beads or fibers that effect a connection between the surface contacts 18 of the ceramic substrate 13 and the connecting pads 17 of the semiconductor chip 15. Furthermore, said plastic 18 also absorbs stresses that may result from a different thermal expansion of the ceramic material and the semiconductor chip 15. Said flip-chip technology makes possible a very high connection density, with the result that it likewise contributes to a volume reduction of the entire circuit. The light-emitting diodes themselves can also be applied to the upper side of the multilayer circuit 15 using this technology. It goes without saying that resistors 22 or inductances of the circuit may also be disposed as discrete parts on the surface.

The method according to the invention for operating the light-emitting diodes consequently make possible a very simple and effective control of the brightness. Furthermore, there is the option of using technologies known from the electronic ballast for fluorescent lamps analogously also to operate the light-emitting diodes, with the result that variable and comfortable control options are available in this connection. Furthermore, there is the option of matching the supply voltage, the dielectric strength and the conductive strength of the power switches to the requirements of the LED arrays, which also makes possible the integration of the circuit arrangement on a single chip if three or more LED colors are used, with the result that very compact and high-performance illumination means can be formed. Finally, a high-voltage process for the bridge driver can also be dispensed with if an appropriate supply voltage is chosen.

What is claimed is:

1. A circuit arrangement for supplying voltage and controlling the operating behavior of at least one light-emitting diode for illumination purposes, said circuit arrangement comprising:

at least one inverter that is connectable to a direct-voltage source and whose output frequency is variable, said inverter comprising at least two controllable power switches connected to convert a supplied direct voltage, delivered by a direct-voltage source, into a bipolar alternating voltage and a load circuit connected to an output of the inverter, said load circuit comprising a resonance element and containing at least one light-emitting diode, said load circuit connected to be driven by said bipolar alternating voltage, the switching frequency of the power switches being alterable to control the brightness of the at least one light-emitting diode by controlling the current flowing through the at least one light-emitting diode.

2. A circuit arrangement according to claim 1, wherein:

said load circuit comprises at least two light-emitting diodes that are connected in antiparallel.

3. A circuit arrangement according to claim 1, wherein:

a rectifier is connected upstream of said at least one light-emitting diode.

4. A circuit arrangement according to one of claims 1 to 3, and further including means for determining the amount of light delivered by said at least one light-emitting diode.

5. A circuit arrangement according to one of claims 1 to 3, and further including means for determining the current flowing through said at least one light emitting diode.

6. A circuit arrangement according to claim 5, wherein:

the switching frequency of said power switches is regulable as a function of the determined current.

7. A circuit arrangement according to claim 5, wherein;

the supply direct voltage delivered by said direct voltage source is regulable as a function of the determined current.

8. A circuit arrangement according to one of claims 1 to 3, wherein:

said circuit arrangement comprises light-emitting diodes of various colors, and wherein an inverter is provided for light-emitting diodes of each color.

9. A circuit arrangement according to one of claims 1 to 3, wherein:

a plurality of light-emitting diodes is combined to form an array.

10. A circuit arrangement according to one of claims 1 to 3, wherein:
said inverter is formed by two controllable power switches disposed in a half-bridge circuit.

11. A circuit arrangement according to one of claims 1 to 3, wherein:
said inverter is formed by controllable power switches disposed in a full bridge circuit.

12. A circuit arrangement according to claim 10, wherein:
said power switches are field-effect transistors.

13. A circuit arrangement according to one of claims 1 to 3, wherein:
the switching frequency of the power switches is in the range between 200 kHz and 1 MHz.

14. A circuit arrangement according to one of claims 1 to 3, wherein:
said circuit comprises at least one multilayer circuit into which passive components of the switching arrangement are integrated.

15. A circuit arrangement according to claim 14, wherein:
said multilayer circuit comprises a plurality of printed circuit boards disposed above one another and having applied to their upper and/or lower sides, conductor tracks composed of a conductive material applied and holes filled with conductor tracks.

16. A circuit arrangement according to claim 14, wherein said multilayer circuit is an LTCC structure that comprises a plurality of low-sintering ceramic layers disposed one above another and between which conductor tracks are situated, said ceramic layers having holes for connecting conductor tracks of different levels.

17. A circuit arrangement according to claim 16, wherein:
said multilayer circuit is surrounded by a metallic housing.

18. A circuit arrangement according to claim 17, wherein:
semiconductor chips are mounted on a surface of said multilayer circuit by means of flip-chip technology.

19. A method of supplying voltage and controlling the operating behavior of at least one light-emitting diode for illumination purposes, said method comprising:

connecting at least one inverter to a direct-voltage source, said inverter having a variable output frequency and including at least two controllable power switches for converting a supplied direct voltage into an alternating voltage and connecting a load circuit to the output of the inverter, said load circuit including a resonance element and at least one light-emitting diode, said load circuit being driven by said bipolar alternating voltage, and alternating the switching frequency of said power switches to control the brightness of the at least one light-emitting diode by controlling the current flowing through the at least one light-emitting diode.

20. A circuit arrangement according to claim 11, wherein:
said power switches are field-effect transistors.

* * * * *